Aug. 14, 1962 S. FISCHER ET AL 3,048,889
PROCESS AND APPARATUS FOR FORMING HOLLOW OBJECTS
Filed March 8, 1960 3 Sheets-Sheet 1
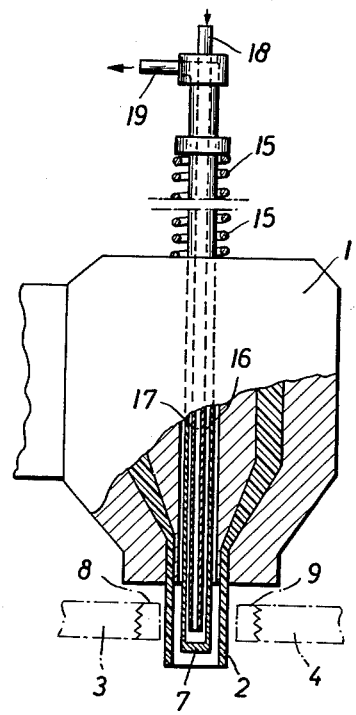
Fig.1
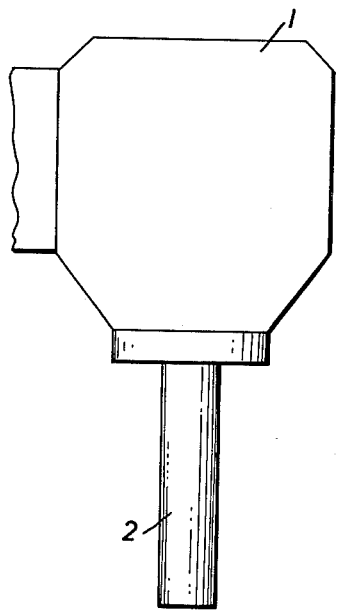
Fig. 2
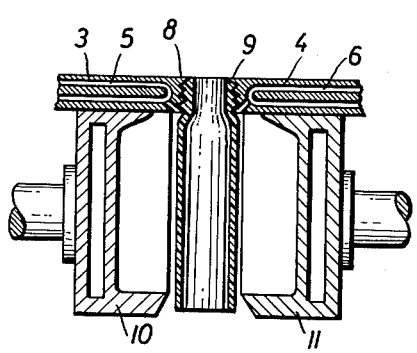
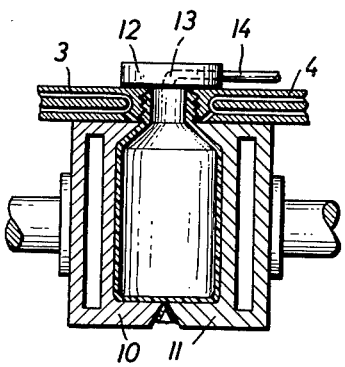
INVENTORS
STEFAN FISCHER
AND
BY RAINER FISCHER

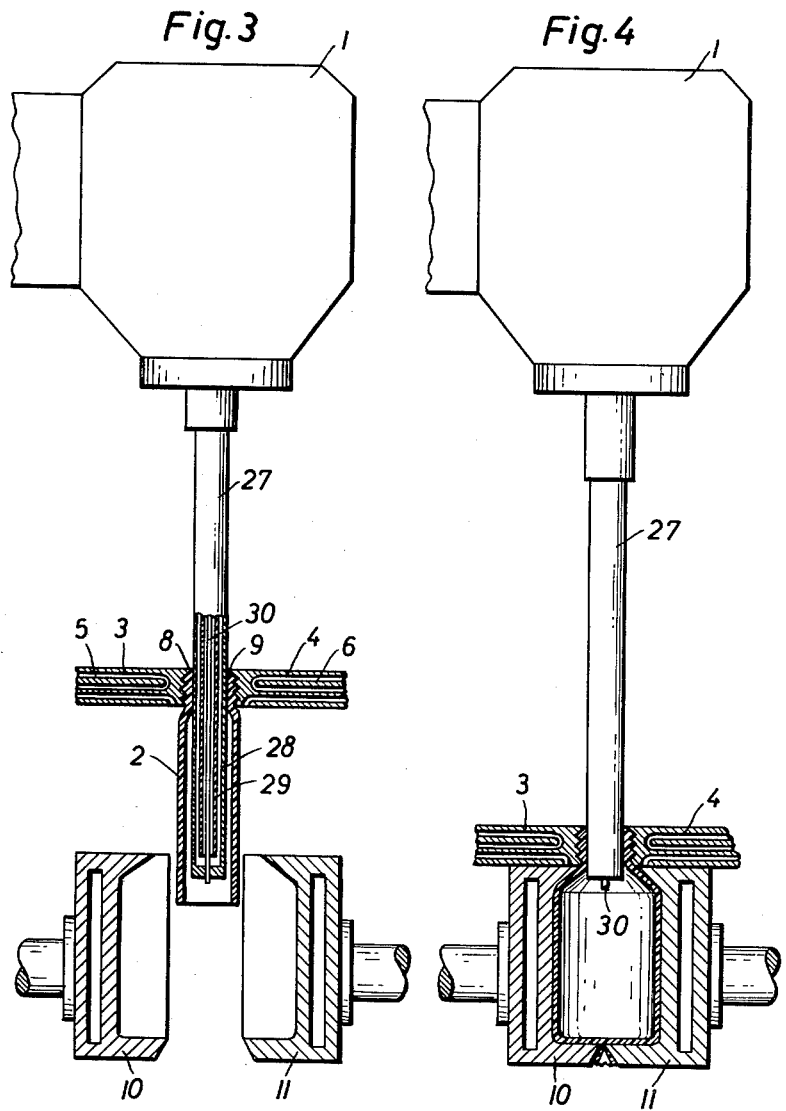

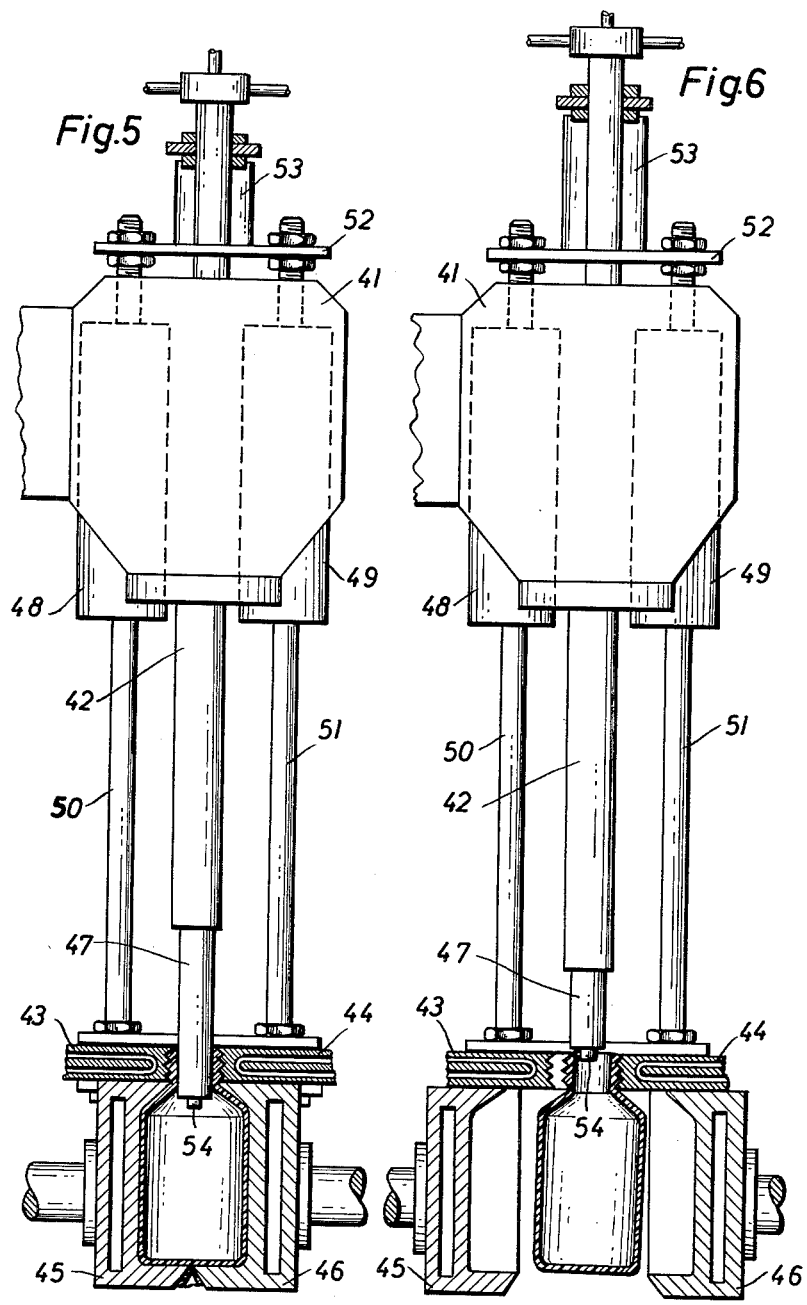

United States Patent Office 3,048,889
Patented Aug. 14, 1962

3,048,889
PROCESS AND APPARATUS FOR FORMING
HOLLOW OBJECTS
Stefan Fischer and Rainer Fischer, both of
Lohmar, near Koln, Germany
Filed Mar. 8, 1960, Ser. No. 13,469
Claims priority, application Germany Mar. 10, 1959
7 Claims. (Cl. 18—5)

This invention relates broadly to a process and device for the production of bottles or similar hollow articles from plastic polymers.

There are, at present, several well-known processes for the production of plastic bottles or the like. Generally the conventional processes first requires the formation of a hollow tube or the like from a plastic material. This hollow tube is then introduced between the halves of a two part mold which is closed around the hollow tube. A fluid is then introduced into the central hollow portion of the tube under pressure, expanding it against the internal cavity forming the mold walls. The plastic is then cooled and hardened thereby forming the finished object.

In the conventional equipment, as described above, it is general to extrude the plastic tube downward vertically between the open mold parts. In an effort to obtain continuous extrusion of the tubing to be blown, and thereby increase production, several methods have been proposed whereby the extrusion head and the mold halves are arranged movably in relation to each other. This permits the extrusion of a tube of plastic material during the period that the previous tube is being formed into the finished product and cooled inside the mold. It will be apparent that this arrangement will permit continuous extrusion.

There are other several disadvantages in any of the presently proposed processes. The extruded tube will generally be strained the most at its warmest section, that is, the portion of the tube which has just issued from the extrusion head. This warmest and thereby weakest section of the tube must support the entire length of tubing already extruded. This results in a measurable amount of "necking down" of the thickness of the tube at its weakest and warmest sections. This effect is magnified greatly when producing relatively long tubing prior to forming, as in the case of tall bottles or the like. This problem is even more serious when considering the rather precise dimensional stability which must be maintained for forming the neck and thread section of the bottle.

Furthermore, in order to obtain continuous production in machinery as described above, it is necessary to move the mold itself relative to the extrusion head. This constant movement of the relatively great mass of mold not only utilizes great quantities of power but often results in uneven or rough operation of the machine.

The present invention is especially efficient in overcoming the above mentioned objections and others. Briefly, this is accomplished by the expedient of grasping a portion of the warmest section of the extruded tube oon after it is formed, and partially cooling it. The tube is then severed to a predetermined length and is introduced between the open halves of a relatively stationary mold situated some distance from the extrusion head. Generally it will be preferable to form the bottle neck and threads during this grasping and cooling operation.

Since generally the mold halves will then be situated some distance away from the extrusion head, the introduction of the severed length of tubing therebetween will take place with a speed greater than the extrusion speed so that no interruption of the extrusion operation will occur, and further so that there will be sufficient time for the inflation of the tube into the finished hollow article. It will generally be preferable to sever the tubing so that its length exceeds, by some small distance, the height of the article to be formed. That is so that upon the closing of the mold halves about the tube, one end of the said tube can be pinched shut. The remaining residue may then be removed.

More particularly then, a device constructed according to the above described process will include a head for continuous extrusion of a hollow tube, and a separable mold to receive the tube, and means to inflate the tube to the walls of the internal cavity of the mold when closed to form the finished product, and gripping means to first cool the warmest end of the length of severed tubing and then to transfer the severed length of tubing between the separated mold parts situated some distance from the extrusion head. More particularly, the gripper means may conist of two jaws or the like movable towards or away from each other. When moved together they are arranged to grasp one section of the tube about its entire periphery. It will be usual to provide each of the jaws with a channel for a cooling medium and connections for the supply and discharge thereof. It will further be possible to provide each of the jaws with cooling air supply channels and discharge apertures for the cooling air. This will permit cooling air to issue over and thereby cool a portion of tubing in juxtaposition the jaws.

The gripping means may be provided with a cutting arrangement for severing the grasped length of tubing from the extrusion head or in the alternative, can be constructed itself to sever the length of tubing. It will usually be found preferable to construct the gripping means to function simultaneously as a form of compression mold for the bottle neck. It will then be possible to utilize the gripping means to shape and precisely form the bottle neck and threads simultaneously with its grasping and cooling functions. To more efficiently accomplish this forming operation, there will be provided a central mandrel within a portion of the extrudel tube. The external diameter of the mandrel will correspond to the desired internal diameter of the opening of the bottle neck to be formed. This mandrel, which is preferably provided with cooling channels for a cooling medium and the pertinent connections for the supply and removal thereof, can be mounted in axially displaceable fashion in and below the extrusion head.

There will be several advantages obtained by providing such an axially displaceable mandrel. For example, the mandrel, when moved for even a short distance along with the severed length of tubing, will cool the internal diameter of the bottle neck and thereby result in additional stability. Additionally, the mandrel will serve to prevent excessive deformation of the section of the next length of extruder tubing adjacent the cutting jaws. Still further, a moveable mandrel insures that the extruded length of tubing will be stable while being moved to the mold, especially when the molds are situated laterally of the extrusion head.

It has been found desirable in certain instances to provide a spring which will automatically return the mandrel to its initial position after each displacement. The displacement itself can be limited and adjusted by automatic stops. Additionally, the mandrel may be constructed of sufficient length to extend partially into the mold or may be constructed so as to be movable partially into the mold along with the severed length of tubing. In either case, the mandrel may then be provided with a pressure fluid conduit for the supply of fluid to inflate the severed length of tubing against the internal cavity of the mold. It will be realized, however, that this is not a necessary feature of the invention in that it will be possible to supply pressure fluid in other ways, such as by providing a connection piece placeable in air tight fashion on the upper side of the gripper jaws.

The said mandrel may also be utilized for the purpose of automatically ejecting the finished hollow object from the mold rapidly and without any damage thereto. Conventionally, a finished object will not drop readily from a mandrel after the mold sections are opened, and some additional mechanism must be utilized for this purpose. This additional mechanism often causes some deformation of the finished article unless said finished article is extensively cooled. For example, the bottom of the bottle may be caused to sag outward. This makes it necessary in the conventional apparatus to allow a certain time to elapse, with maintenance of the internal pressure, before the bottle or the like can be ejected. When, as is often attempted, the mandrel is withdrawn from the bottle neck before the mold sections are opened, the bottle or the like most often will remain hanging to one of the mold sections.

The above difficulties will be eliminated in a construction according to this invention. This may be accomplished by only partially removing the mandrel from the bottle after the bottle is formed, but leaving a portion of the mandrel still extending into the bottle neck. This extending portion of the mandrel will be of a reduced and preferably greatly reduced diameter in comparison with the internal diameter of the bottle neck. If the mandrel is provided with a supply conduit for the inflation fluid, this supply conduit can be allowed to project from the mandrel by a certain amount from its forward end so that only the supply conduit will remain within the bottle neck. Thereupon, when the mold sections are opened, the supply conduit will prevent the finished article from adhering and moving with any of the mold sections and it is of sufficiently reduced diameter to insure the free falling of the finished hollow article.

In the construction as above described wherein the mandrel and the gripper means are both movable, a common moving arrangement may be provided. A separate lifting arrangement will be provided as part of the common moving arrangement to withdraw the mandrel partially from the finished hollow object for automatic ejection.

It will be realized that many forms and embodiments of the device and process described above may be constructed. One method for the fabrication of bottles or the like is illustrated by way of example in the accompanying diagrammatic drawings wherein:

FIG. 1 is a side elevational view mainly in section showing the extrusion head, mandrel and mold arrangements in a first embodiment of the invention wherein the mandrel is movable over a limited path.

FIG. 2 is a side elevational view partially in section corresponding to FIG. 1 but illustrating the article to be formed in its blown or expanded position.

FIG. 3 is a side elevational view partially in section of an alternate embodiment of this device wherein the mandrel can be guided and moved into a portion of the mold.

FIG. 4 is a side elevational view partially in section corresponding to FIG. 3 but showing the article to be formed in its blown or expanded position.

FIG. 5 is a side elevational view partially in section illustrating a third alternate embodiment of the invention wherein the mandrel is movable together with the gripping means by a common movement device and wherein the mandrel series has an automatic ejector for the finished hollow articles.

FIG. 6 is a side elevational view partially in section illustrating the position of the parts at the time of automatic ejection of the finished article.

In FIGS. 1 and 2, which illustrate one of the preferred forms of the invention, there is illustrated generally a conventional extrusion head 1 extruding a length of tubing 2 in a vertically downward direction. It will be noted that the extrusion head 1 is constructed and arranged for continuous extrusion. Provided below the extrusion head 1 are a pair of gripper jaws 3 and 4. It will be noted that means (not illustrated) are provided for moving the said gripper jaws 3 and 4 from a first position shown in phantom in FIG. 1 to a second position shown in cross section in FIG. 1 and then back to the first position.

When the extruded tube 2 reaches a predetermined length, the gripper jaws in their phantom position as shown in FIG. 1, move towards one another and embrace the tube at its upper warmest end. As illustrated, the gripper jaws 3 and 4 are provided with cooling channels 5 and 6 and thereby cool the section of the embraced tube. Furthermore, the gripper jaws 3 and 4 are constructed so that when together they compress a portion of the extruded tube 2 against the center mandrel 7, which is positioned to extend into the inner cavity of the tube. This compression will form a portion of the internal and external diameters of the finished article and in the case of a bottle, may form its neck. The gripper jaws 3 and 4 are further provided with cutting edges 8 and 9 at its upper end to sever the length of tube 2 from the continuous extrusion from the extrusion head 1.

Simultaneously with the grasping and severing of the length of tubing 2, or immediately thereafter, the gripper jaws 3 and 4 engaged with the severed tube 2 move relatively rapidly to their second or lower position as illustrated in cross section near the bottom of FIG. 1. In that position, they are in contact with the top of the separated mold sections 10 and 11 which will generally be situated some distance below the extrusion head 1. The mold halves 10 and 11, as illustrated, are below the extrusion head 1 by a distance somewhat greater than the length of the severed tubing 2. The gripper jaws 3 and 4 will move downward against the said mold sections with a rate of speed somewhat greater than the extrusion speed of the head 1. As illustrated then, the severed length of tubing 2 will be between the mold sections 10 and 11 while the next length of tubing is in the process of being extruded.

Referring now more particularly to FIG. 2 of the drawings, the mold sections 10 and 11 close about the severed length of tubing while simultaneously sealing its lower end and severing the relatively small piece of tubing hanging below. A connection block 12 for the expanding fluid is then introduced in an air tight fashion at the top of the gripper jaws 3 and 4. As illustrated, the exit aperture 13 of the connection block 12 is then in communication with the internal opening of the severed tube 2. Compressed fluid such as air or the like will be supplied through conduit 14 to expand the severed length of tubing into intimate contact with the internal portion of the mold sections 10 and 11.

After the parts are allowed to cool somewhat, the connection block 12 will be removed and the finished article will be ejected by opening the mold sections 10 and 11 and the gripper jaws 3 and 4. Immediately after the opening of the gripper jaws 3 and 4 they will return to their initial position as shown in phantom in FIG. 1, ready to repeat the cycle just described on the next length of extruded tubing.

In some instances it has been noted that the interval of time during which the bottle neck rests on the mandrel 7 after the closing of the gripper jaws 3 and 4, is not sufficient to form and stabilize the internal diameter of the neck of the article to be formed. In one form of the invention, therefore, it has been found preferable to mount the mandrel 7 for limited axial movement. After the closing of the gripper jaws 3 and 4, the mandrel 7 can move along with the said jaws for a limited distance in their downward movement. This permits the cooling of the article for a longer period of time. The range of movement of the mandrel 7 may be limited by a stop. As soon as the mandrel has reached the limit of its path of movement, the article neck will be pulled from the mandrel 7 by the continued movement of the gripper jaws 3 and 4. The mandrel 7 will then return, as under the influence of a spring 15, to its initial position.

Whether or not the mandrel 7 is movable, cooling channels 16 and 17 may be provided therewithin and some cooling medium may be circulated as through connections 18 and 19.

We will refer now more particularly to the embodiment of the invention depicted in FIGS. 3 and 4. Since this embodiment is similar in most essential respects with that embodiment illustrated in FIGS. 1 and 2, the same reference numerals have been utilized to indicate the same parts where possible.

The essential distinguishing feature of this embodiment is that the mandrel 27 is of sufficiently long length to extend from the extrusion head 1 to a point partially between the mold sections 10 and 11. It is to be noted, however, that the mandrel 27 may either be of the stationary type, as illustrated, or may be mounted for limited axial displacement relative to the extrusion head 1 as heretofore described and illustrated in FIGS. 1 and 2. In either instance, however, the mandrel 27 may again be provided with cooling channels 28 and 29 but further will have an expansion fluid supply channel 30 for the blowing air.

The operation of this embodiment of the invention is substantially similar to that illustrated in FIGS. 1 and 2. After a length of tubing 2 is extruded from the head 1, the gripper jaws 3 and 4 will close and thereby sever a length of tubing and form a portion of the article as previously described. The extruded and severed length of tubing 2 will then slide downward over the mandrel 27, moving relative thereto until the gripper jaws 3 and 4 rest at the top of the mold sections 10 and 11. The mold sections 10 and 11 will then close, sealing the lower end of the severed length of tubing as previously described. The fluid such as air or the like for the expansion of the length of tubing into intimate contact with the internal cavity of the mold will be introduced through the fluid conduit 30 in the mandrel 27, thereby eliminating the need for a separate fluid supply means.

We will now refer more particularly to the embodiment of the device illustrated in FIGS. 5 and 6. As in the previous embodiments, an extrusion head 41 from which a continuous length of tubing 42 is extruded must be provided. During the initial stages of the cycle, as in the previous embodiments, the gripper jaws 43 and 44 are located in juxtaposition the extrusion head 41. Furthermore, the mandrel 47 extends only partially below the extrusion head 41 so that its most downward end is located between the gripper jaws 43 and 44.

As in the previous embodiments, the mold sections 45 and 46 are positioned some distance beneath the extrusion head 41. It will be noted that the gripper jaws 43 and 44 may be moved up and down to a first and second position together with the mandrel 47 by a common lifting and lowering arrangement such as hydraulic cylinders 48 and 49. The guide and actuating rods 50 and 51 of this lifting and lowering arrangement may be connected at their upper ends by a cross member 52 which is further connected to the mandrel 47. It is important to note, however, that the mandrel 47 may be moved a limited amount by second lifting and lowering arrangement 53 relative to cross member 52 and gripper jaws 43 and 44.

When the gripper jaws 43 and 44 have moved to its lower position, the mandrel 47 carried downward therewith by cross member 52 will extend partially into the article to be formed. A fluid for blowing will be introduced through an opening through the center of the mandrel 47 forming the finished article as illustrated in FIG. 5. Immediately thereafter, the lifting arrangement 53 situated at the cross member 52 will lift the mandrel 47 a limited amount. When in its partially withdrawn position only a portion 54 of the mandrel 47 of reduced diameter will remain within the formed article. In one form of the embodiment already constructed, the reduced diameter extension 54 further serves as the expansion fluid conduit.

If then as shown in FIG. 6, the mold sections 45 and 46 are opened first, the finished article will be retained in position by the gripper jaws 43 and 44. This prevents the "hanging up" of any portion of the finished article to either of the mold halves 45 and 46. If upon the opening then of the gripper jaws 43 and 44 the formed article should "hang up" on either of the said jaws (for example, jaw 44 in FIG. 6). The inner wall of the neck of the finished article will abut against the reduced diameter portion 54 projecting from the mandrel 47. This will serve to detach the finished article from the gripper jaws, and the finished article will then fall downwards from the mold.

Simultaneously then, with the assent of the gripper jaws 43 and 44, the mandrel 47 will be returned by its lifting and lowering arrangement 53 into its initial position relative to the said gripper jaws.

It will, of course, be realized that the mold sections 10 and 11 may be arranged laterally of the extrusion head. The molds may then lie with their tops at the level of the underside of the gripper jaws 3 and 4 (in the position illustrated in phantom in FIG. 1). After the closing of the gripper jaws the mandrel 7 may be retracted into the extrusion head so that its bottom end will lie somewhat above the gripper jaws 3 and 4 which will then move laterally bringing the extruded length of tubing to the open mold sections. A separate compressed air supply will then be provided to blow the extruder tubing into intimate contact with the internal portion of the closed mold sections.

The above should suffice to impart a clear understanding of the invention.

While there are above disclosed but a limited number of embodiments of the structure and product of the invention herein presented, it is possible to produce still other embodiments without departing from the inventive concept herein disclosed, and it is desired, therefore, that only such limitations be opposed on the appended claims as are stated therein, or required by the prior art.

We claim:

1. A device for blowing hollow objects comprising, means for continuous extrusion of hollow tubing, and a separable mold to receive the said tubing, means to inflate the said tubing within the said mold to form the said hollow object, and gripping means to first cool the warmest end of said tubing and then to sever and transfer the said tubing to a point intermediate the said separated mold parts, said gripper means including separable jaws which, when closed, will grasp the said warmest section of said tube around its entire periphery, each of said jaws having channels for the circulation of a cooling medium therein, and a mandrel within a portion of said tube whereby when said jaws close about said tube they will compress a portion of the tube between said mandrel and said jaws, thereby forming a portion of the said hollow object, said mandrel having a second set of channels for the circulation of a cooling medium whereby a portion of the interior of the said hollow object may be cooled.

2. A device for blowing hollow objects comprising, means for continuous extrusion of hollow tubing, and a separable mold to receive the said tubing, means to inflate the said tubing within the said mold to form the said hollow object, and gripping means to first cool the warmest end of said tubing and then to sever and transfer the said tubing to a point intermediate the said separated mold parts, said gripper means including separable jaws which, when closed, will grasp the said warmest section of said tube around its entire periphery, each of said jaws having channels for the circulation of a cooling medium therein, and a mandrel within a portion of said tube whereby when said jaws close about said tube they will compress a portion of the tube between said mandrel and said jaws, thereby forming a portion of the said hollow object, said mandrel having a second set of channels for the circulation of a cooling medium whereby a portion of the interior of the said hollow object may be cooled, said mandrel having means for limited axial movement together with said gripping means.

3. A device for blowing hollow objects comprising, means for continuous extrusion of hollow tubing, and a separable mold to receive the said tubing, means to inflate the said tubing within the said mold to form the said hollow object, and gripping means to first cool the warmest end of said tubing and then to sever and transfer the said tubing to a point intermediate the said separated mold parts, said gripper means including separable jaws which, when closed, will grasp the said warmest section of said tube around its entire periphery, each of said jaws having channels for the circulation of a cooling medium therein, and a mandrel within a portion of said tube whereby when said jaws close about said tube they will compress a portion of the tube between said mandrel and said jaws, thereby forming a portion of the said hollow object, said mandrel having a second set of channels for the circulation of a cooling medium whereby a portion of the interior of the said hollow object may be cooled, said mandrel having means for limited axial movement together with said gripping means, whereby additional cooling of said internal portion of said hollow object may be effected while said gripping means transfer the said tube to the said separable molds, said axially displaceable mandrel partially extending into the interior of said separable molds along with said tube and containing the inflation means therein.

4. The process of forming hollow objects, including the steps of, extruding a continuous length of hollow tubing, severing a length of the said tubing, grasping and cooling the warmest portion of said severed length of tubing about a preferably cooled mandrel, thereby forming the finished dimensions of a portion of the said hollow object, and transferring said severed length of tubing to remote separable molds and inflating said severed tubing within said separable molds.

5. The process of forming hollow objects, including the steps of, extruding a continuous length of hollow tubing, severing a length of the said tubing, grasping and cooling the warmest portion of said severed length of tubing about a preferably cooled mandrel, thereby forming the finished dimensions of a portion of the said hollow object, and transferring said severed length of tubing to remote separable molds and inflating said severed tubing within said separable molds, said grasped and cooled portion of said severed length of tubing forming one portion of said hollow object.

6. The process of forming hollow objects, including the steps of, extruding a continuous length of hollow tubing, severing a length of said tubing, grasping and cooling the warmest portion of said severed length of tubing about a preferably cooled mandrel, thereby forming the finished dimensions of a portion of the said hollow object, and transferring said severed length of tubing to remote separable molds and inflating said severed tubing within said separable molds, said grasped and cooled portion of said severed length of tubing forming one portion of said hollow object, and further including cooling said inflated tube within said separable molds.

7. A process as set forth in claim 6 wherein said severing and said cooling are accomplished simultaneously.

References Cited in the file of this patent

UNITED STATES PATENTS

| 2,783,503 | Sherman | Mar. 5, 1957 |
| 2,898,633 | Burch | Aug. 11, 1959 |
| 2,936,481 | Wilkalis et al. | May 17, 1960 |
| 2,936,489 | Sherman | May 17, 1960 |
| 2,978,745 | Langecker | Apr. 11, 1961 |

FOREIGN PATENTS

| 688,997 | Great Britain | Mar. 18, 1953 |
| 206,638 | Austria | Dec. 10, 1959 |